J. F. SANDERS.
Apparatus for Reducing Ores and Separating Metals.
No. 150,794. Patented May 12, 1874.
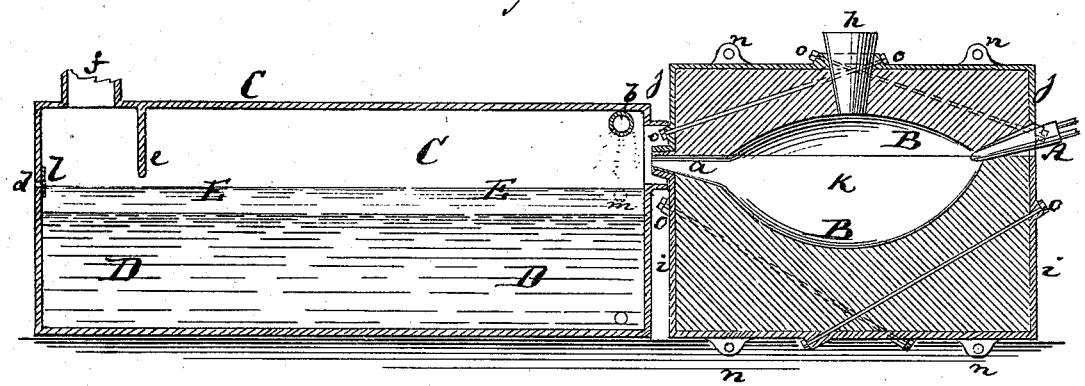
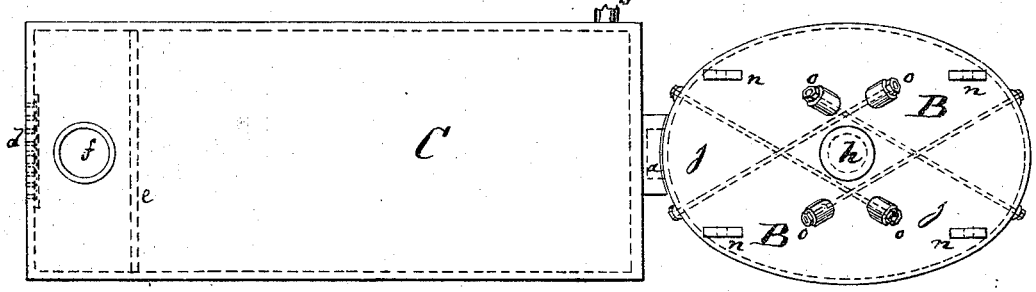
Witnesses:
Chas. Raettig
E. C. Webb
Inventor:
J. F. Sanders
by his attorney
A. v. Briesen United States Patent Office.

JOHANN F. SANDERS, OF LOUISVILLE, KENTUCKY.

IMPROVEMENT IN APPARATUS FOR REDUCING ORES AND SEPARATING METALS.

Specification forming part of Letters Patent No. 150,794, dated May 12, 1874; application filed April 20, 1874.

CASE 1.

*To all whom it may concern:*

Be it known that I, JOHANN FRIEDRICH SANDERS, of Louisville, in the county of Jefferson and State of Kentucky, have invented a new and Improved Apparatus for Treating and Reducing Ores, of which the following is a specification:

In the accompanying drawing, Figure 1 represents a vertical longitudinal section of the apparatus, and Fig. 2 is a plan or top view of the same.

Similar letters of reference indicate corresponding parts in both figures.

This invention relates to an apparatus for treating auriferous and other ores, more particularly for carrying into effect the process of treating and amalgamating ores, which is described in an application for a patent which is filed at the same time with the present application. My present invention consists, chiefly, in constructing an apparatus for treating ores, of two shells, of oval or other form, which are filled with unslaked lime, the lime constituting the interior faces of the smelting-furnace, so that its reflective and heat-resisting properties may be fully utilized. The invention also consists in combining the furnace, which is constructed of two shells, as stated, with a trough or condensing-chamber, within which a vapor-shield is arranged, whereby the vapors that escape from the furnace and contain the gold in vaporized condition, will be brought into close contact with the surface of the water contained in such trough, and thereby so far condensed as to yield up their auriferous constituents, all as has been more fully described in the application for a patent for the process.

In the accompanying drawing, the letter A represents a tuyere, which serves to conduct hydro-oxygen gas into the furnace B. This furnace is composed of two shells, of oval or other suitable form, the lower shell, $i$, being of the same form substantially as the upper shell, $j$, so that the two shells, when superposed, will constitute the walls of the furnace. Each of the shells is filled with unslaked lime, but a smelting-chamber, $k$, is produced by cutting away or otherwise hollowing out the contiguous faces of the lime in the shells, as is fully indicated in Fig. 1. Into this smelting-chamber the gases are conducted by the tuyere A, and into said chamber also are conducted the ores which are to be reduced or sublimated. These ores are introduced through the opening $h$, which is formed in the upper part of the furnace, and is closed by a suitable plug. After the blast has been applied to the contents of the chamber the vapors will escape therefrom through an opening, $a$, which leads into the condensing vessel or trough C. Within this condensing vessel or trough is a layer or bed of quicksilver, D, and upon that a sheet or layer of water, marked E. The vapors escaping from the furnace are thus conducted over the surface of the water and condensed to such an extent as to yield the precious metals contained in them, the remaining vapors escaping through a pipe or exhaust, $f$. In order to force the vapors into close contact with the surface of the water a vapor-shield, $e$, is arranged transversely within the trough C, and reaches nearly to the water, so that all the vapors will, by such shield, be deflected and brought into close and absolute contact with the water. The water is conveyed into this trough through a pipe, $b$, which is arranged at the upper part of the trough, and perforated with fine holes to discharge the water in a fine spray into the trough, said spray intercepting the volume of vapor which escapes from the furnace, and adding thereby in the condensing process above referred to. The overflow for the water in the trough is arranged at the further end of the latter, or at any other suitable part in the form of small holes, $d$, over which a sieve, $l$, is, by preference, placed, in order to prevent the escape of any fine particles of metal that may have entered the water. If it is desired to have the water conveyed into the trough below the water-line therein, the pipe $b$ may be dispensed with, and in its place a pipe, $m$, which is indicated by dotted lines in Fig. 1, substituted.

As to the construction of the shells $i$ and $j$, I may add that the same are, by preference, provided with staples or loops, $n$, at their outer faces for inserting bars or rods through such loops, by means whereof the shells may be carried. There may be also suitable braces, o, arranged in a suitable manner in the shells respectively, for properly holding them together, and retaining their shape under the influence of the heat.

As to the size of the furnace, it will be well to understand that I prefer to make it of such size that two men can conveniently carry each shell; and, that if it is of such weight, it will still be sufficiently large to hold about one hundred and fifty pounds of ore. The trough C may be made about two feet wide and from eight to ten feet in length, or other proportions may be substituted according to the kind of ore which it is desired to reduce, and according to the amount of precious metal with which the same is charged, it being, of course, essential to have a longer trough where there is a larger proportion of precious metal in the ore.

In this apparatus a ton of ore can be conveniently reduced in one day, though each charge may only be 150 pounds.

I claim as my invention—

1. The furnace B made of two shells $i$ and $j$, which are filled with lime and arranged to form the escape-opening $a$, and a receptacle for the tuyere A, substantially as described.

2. The condensing-trough C, provided with the vapor-shield $e$ transversely above the condensing-liquid, as specified, and combined with the furnace B, made of two shells, $i$ and $j$, substantially as described.

J. F. SANDERS.

Witnesses:
A. V. BRIESEN,
E. C. WEBB.